(12) United States Patent
Song et al.

(10) Patent No.: US 12,391,378 B2
(45) Date of Patent: Aug. 19, 2025

(54) MORPHING ORIGAMI STRUCTURES WITH LIGHT-RESPONSIVE POLYMERS

(71) Applicant: Toyota Motor Engineering & Manufacturing North America, Inc., Plano, TX (US)

(72) Inventors: Yuyang Song, Ann Arbor, MI (US); Shailesh N. Joshi, Ann Arbor, MI (US); Danil V. Prokhorov, Canton, MI (US); Umesh N. Gandhi, Farmington Hills, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 18/110,695

(22) Filed: Feb. 16, 2023

(65) Prior Publication Data
US 2024/0278911 A1    Aug. 22, 2024

(51) Int. Cl.
*B64C 31/06* (2020.01)
*F03D 5/00* (2006.01)

(52) U.S. Cl.
CPC ............... *B64C 31/06* (2013.01); *F03D 5/00* (2013.01); *F05B 2280/4003* (2013.01); *F05B 2280/5006* (2013.01)

(58) Field of Classification Search
CPC . B64C 31/06; F03D 5/00; F03D 9/322; F05B 2280/4003; F05B 2280/5006;
(Continued)

(56) References Cited

U.S. PATENT DOCUMENTS

| | | | | |
|---|---|---|---|---|
| 1,105,058 A | * | 7/1914 | Bochau | A63H 27/08 244/153 R |
| 8,528,863 B2 | * | 9/2013 | Sanderson | B64U 70/50 244/49 |

(Continued)

OTHER PUBLICATIONS

Li et al. "Ground and geostationary orbital qualification of a sunlight-stimulated substrate based on shape memory polymer composite", IOP Publishing, published Jun. 6, 2019, 15 pages.

*Primary Examiner* — Joshua D Huson
*Assistant Examiner* — Vicente Rodriguez
(74) *Attorney, Agent, or Firm* — Christopher G. Darrow; DARROW MUSTAFA PC

(57) ABSTRACT

A morphing structure includes a deployable aerodynamic origami structure with an outer covering having a plurality of creases, a tether attached to the deployable origami structure, and a light-responsive polymer disposed on one or more of the creases of the outer covering. The light-responsive polymer is configured to change shape when activated by a light and the deployable origami structure configured to change from a first shape to a second shape different than the first shape when the light-responsive polymer is activated. In some variations, the morphing structure also includes at least one heating element disposed on one or more of the creases of the outer covering and the at least one heating element is configured to heat the light-responsive polymer such that the shape of the deployable aerodynamic origami structure moves from the second shape to the first shape.

20 Claims, 6 Drawing Sheets

(58) Field of Classification Search
CPC .......... F05B 2240/921; F05B 2240/301; F05B 2240/31; F05B 2240/9172
See application file for complete search history.

(56) References Cited

U.S. PATENT DOCUMENTS

| | | | |
|---|---|---|---|
| 10,899,068 B1 | 1/2021 | Tan et al. | |
| 11,084,580 B2* | 8/2021 | Gay | B64C 31/06 |
| 2006/0261213 A1* | 11/2006 | Lavan | B64C 3/30 |
| | | | 244/30 |
| 2011/0042524 A1* | 2/2011 | Hemmelgarn | B64C 3/48 |
| | | | 244/203 |
| 2014/0017025 A1* | 1/2014 | Hemingway | H02G 3/32 |
| | | | 411/15 |
| 2015/0219078 A1 | 8/2015 | Li et al. | |
| 2015/0225080 A1* | 8/2015 | Bormann | B64C 39/022 |
| | | | 244/155 A |
| 2016/0079810 A1* | 3/2016 | Frantz | H02S 40/38 |
| | | | 307/104 |
| 2016/0136877 A1 | 5/2016 | Rogers et al. | |
| 2017/0269188 A1 | 9/2017 | Harne | |
| 2017/0297701 A1* | 10/2017 | Hornzee-Jones | F03D 7/00 |
| 2018/0155018 A1 | 6/2018 | Kovac et al. | |
| 2021/0270253 A1 | 9/2021 | Omenetto et al. | |
| 2022/0389904 A1* | 12/2022 | Reiners | F03D 5/06 |

\* cited by examiner

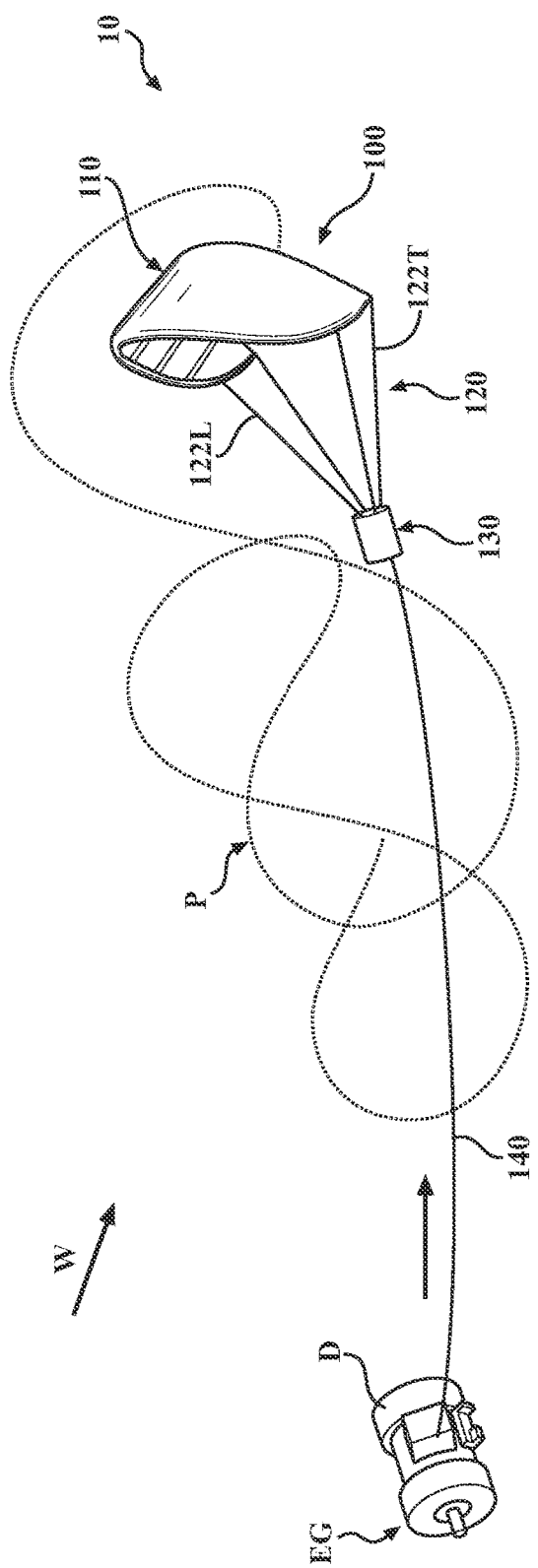
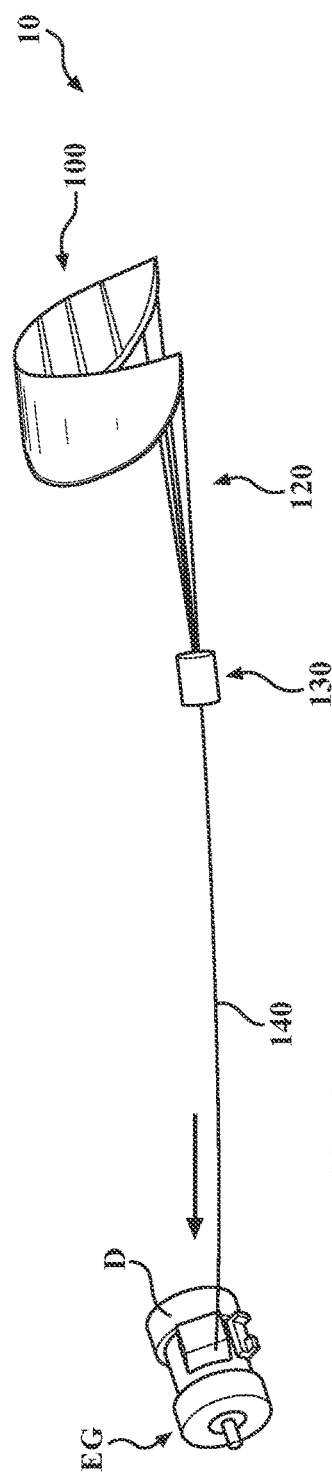
FIG. 2A
PRIOR ART
FIG. 2B
PRIOR ART

MORPHING ORIGAMI STRUCTURES WITH LIGHT-RESPONSIVE POLYMERS

TECHNICAL FIELD

The present disclosure generally relates to morphing structures, and particularly to morphing origami structures for energy generation.

BACKGROUND

Morphing aerodynamic structures such as high-altitude kites for power generation typically include a kite connected to a ground-based or ground-secured electric generator with a tether. Wind, particularly wind in high-altitude jet streams, pushes the kite through the air and unwinds the tether from the electric generator, thereby generating electricity. In addition, a control unit attached to a bridle of the kite is used to control the kite such that it flies in a figure-eight pattern during an unwinding phase of the tether. However, the control unit adds weight to and thereby reduces the efficiency of the kite.

The present disclosure addresses the issue of controlling morphing aerodynamic structures such as the flight of high-altitude kites, and other issues related to morphing structures.

SUMMARY

In one form of the present disclosure, a morphing structure includes a deployable origami structure with an outer covering having a plurality of creases, and a light-responsive polymer disposed on the outer covering. The light-responsive polymer is configured to change shape when activated by a predefined light and the deployable origami structure is configured to change shape when the light-responsive polymer is activated.

In another form of the present disclosure, a morphing structure includes a deployable aerodynamic origami structure with an outer covering having a plurality of creases, a tether attached to the deployable aerodynamic origami structure, and a light-responsive polymer disposed on one or more of the creases of the outer covering. The light-responsive polymer is configured to change shape when activated by a predefined light and the deployable aerodynamic origami structure is configured to change shape when the light-responsive polymer is activated.

In still another form of the present disclosure, a morphing structure includes a deployable aerodynamic origami structure with an outer covering having a plurality of creases, a tether attached to the deployable aerodynamic origami structure, and a light-responsive polymer and at least one heating element disposed on one or more of the creases of the outer covering. The light-responsive polymer is configured to change shape when activated by a predefined light and the deployable aerodynamic origami structure is configured to change from a first shape to a second shape different than the first shape when the light-responsive polymer is activated. And the at least one heating element is configured to heat the light-responsive polymer such that the shape of the deployable aerodynamic origami structure moves from the second shape towards the first shape.

These and other features of the morphing structures will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein:

FIG. 2A shows the high-altitude kite in FIG. 1A tethered to a ground-station electric generator during reeling out and electricity generation;

FIG. 2B shows the high-altitude kite in FIG. 2A during reeling in and electricity consumption;

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides an origami structure with a light-responsive polymer disposed thereon such that morphing of the origami structure is provided when the light-responsive polymer is activated by a predefined light. Stated differently, a morphing origami structure configured to change shape via activation of a light-responsive polymer disposed thereon is provided by the teachings of the present disclosure. As used herein, the phrase "predefined light"

refers to light provided by or propagating from an artificial light source (i.e., not the sun), the term "origami" refers to folding of panels along folding lines (also referred to herein as "creases") to form a desired structure. In some variations, a panel is folded and forms a desired structure without making cuts to the panel, while in other variations a panel is folded and forms a desired structure with making cuts to the panel (also known as kirigami). In addition, morphing origami structures disclosed herein include inflatable morphing origami structures unless otherwise specified.

In one form of the present disclosure, the morphing origami structure is a morphing aerodynamic origami structure such as a high-altitude origami kite (also referred to herein simply as "kite") tethered to a ground-station electric generator (also referred to herein simply as "generator"). And flying and unwinding the kite from the generator generates electricity. The kite includes a body with an outer covering having creases and a tether attached to the body. And instead of controlling an angle of attack, roll, pitch, and/or yaw of the kite using a control unit that controls a bridle of the kite, an artificial light source is used to activate one or more areas with a light-responsive polymer disposed thereon such that the outer covering changes shape and/or dimension, and the angle of attack, roll, pitch, and/or yaw of the kite are at least partially controlled without a control unit and/or a bridle. In this manner, morphing aerodynamic origami structures having less weight and enhanced efficiency than traditional morphing aerodynamic structures are provided.

Figure 1B:
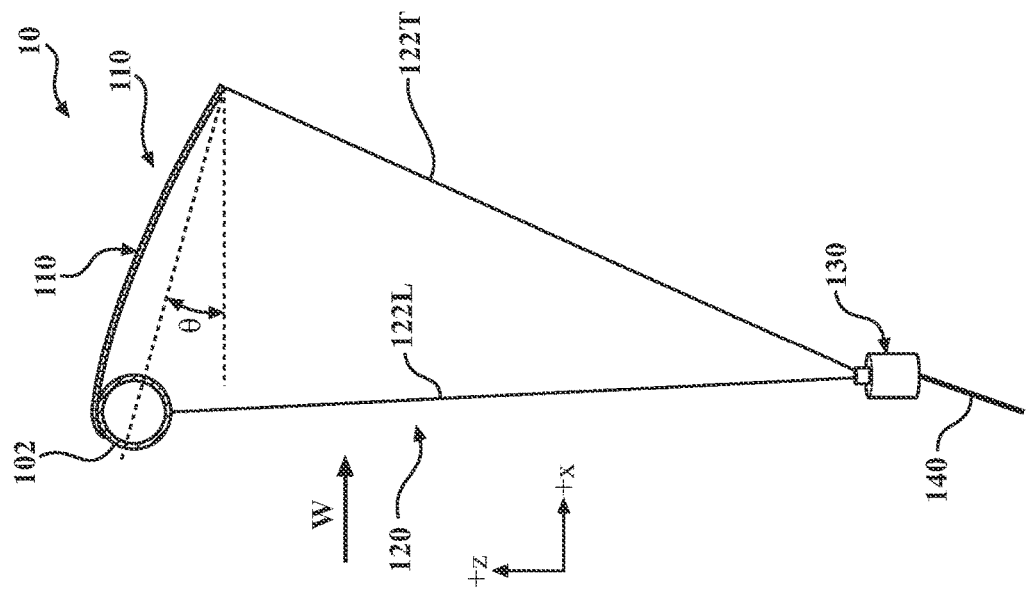
FIG. 1B shows a side cross-section view of FIG. 1A.
Figure 1A:
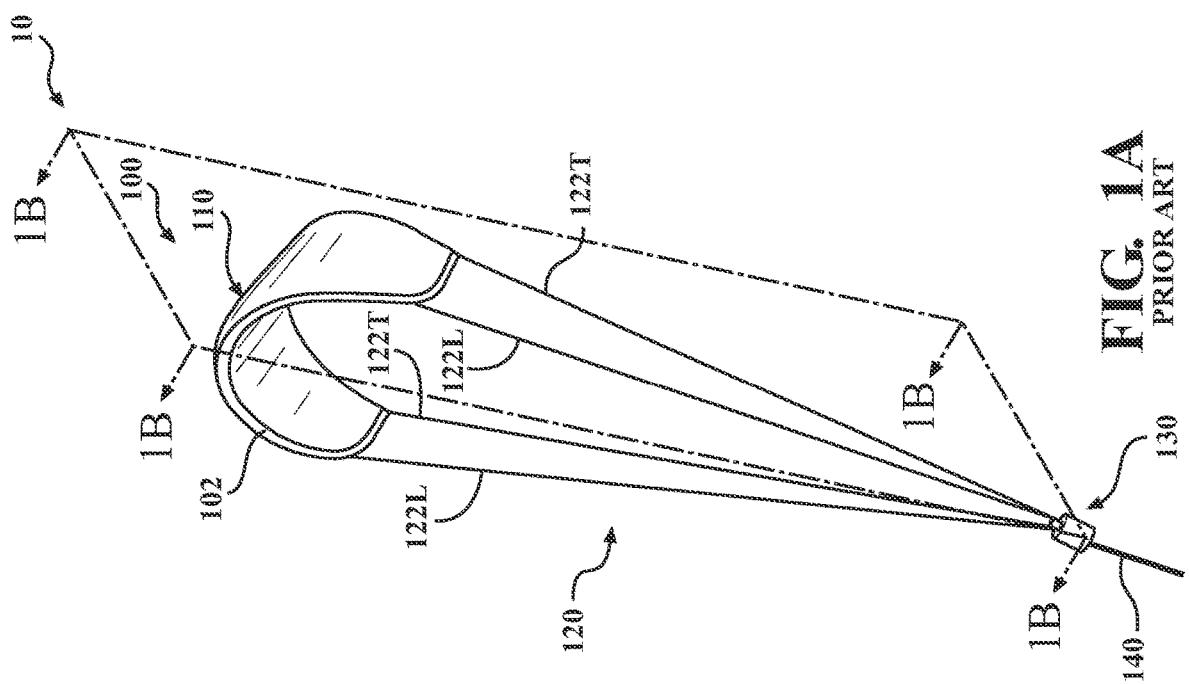
FIG. 1A shows a perspective view of high-altitude kite.

Referring now to FIGS. 1A-1B, a perspective view of a morphing aerodynamic structure 10 is shown in FIG. 1A and a sectional view of section 1B-1B in FIG. 1A is shown in FIG. 1B. The morphing aerodynamic structure 10 includes a body 100 with an outer covering 110 (e.g., a fabric canopy) and a bridle 120 attached to the body 100. In some variations, the body 100 includes an inflated tubular frame (not labeled) with a bow-shaped leading edge tube 102. The leading edge tube 102 of the body 100 is supported by leading edge cords 122L and a trailing edge (+x direction) of the outer covering 110 is supported by trailing edge cords 122T.

The bridle 120 extends from the body 100 to a control unit 130 configured to change a length of one or more of the cords 122L, 122T. For example, in some variations the control unit 130 includes motors, winch drums, and a break such that the cords 122T. 122L can be winched in to reduce the length thereof and winched out to increase the length thereof.

In some variations, the morphing aerodynamic structure 10, and other morphing structures disclosed herein, can include one or more sensors (not shown) configured to detect, measure, and send signals related to environmental conditions (e.g., temperature, humidity, wind speed and direction, among others) and/or morphing aerodynamic structure conditions (e.g., GPS location, elevation, azimuth angles of the tether, traction force on the tether, among others). In addition, the control unit 130 can include one or more computers for communication with the sensors and/or a ground station (not shown), and for motor control of the motors, winch drums, and break.

During operation of the morphing aerodynamic structure 10, wind 'W' blowing through the atmosphere exerts a "traction force" on the outer covering 110 such that the body 100 seeks or desires to move in the +x and +z directions, and a tether 140 transfers the traction force to a ground station (not shown). In addition, the control unit 130 controls or changes the lengths of the cords 122L, 122T such that an angle of attack θ of the body changes and lift (+z force) of the kite increases or decreases. In addition, the control unit 130 is configured to change the length of the cords 122L, 122T such that a roll, pitch, and yaw of the body 100 are controlled and a desired flight path of the morphing aerodynamic structure 10 is provided.

For example, and with reference to FIGS. 2A-2B, the morphing aerodynamic structure 10 is attached to a ground-station electric generator 'EG' with the tether 140, the tether is wound around a drum 'D' of the electric generator EG, and the force of the wind W on the body 100 results in a traction force that simultaneously unwinds the tether 140, turns the drum D, and generates electricity. In addition, by controlling the lengths of the cords 122L, 122T, the control unit 130 controls the angle of attack, roll, pitch, and/or yaw of the body 100 such that the morphing aerodynamic structure 10 flies in a general figure-eight pattern 'P'. The morphing aerodynamic structure 10 is allowed to fly and unwind the tether 140 from the drum D until a desired amount of the tether 140 is unwound and/or a desired amount of electricity is generated by the electric generator EG. Thereafter, i.e., after the "reel-out" stage, the control unit 130 controls the length of the cords 122L, 122T such that the angle of attack of the body 100 is reduced and the electric generator EG winds the tether 140 back onto the drum D during a "reel-in" stage illustrated in FIG. 2B. The energy consumption of the reel-in stage is less than the energy production of the reel-out stage such that a net energy increase is provided and stored in a battery cell and/or provided to a power grid. However, the control unit 130 uses a mechanical winch system to change the lengths of the cords 122L, 122T, and the weight of the mechanical winch system is undesirable.

Figure 3A:
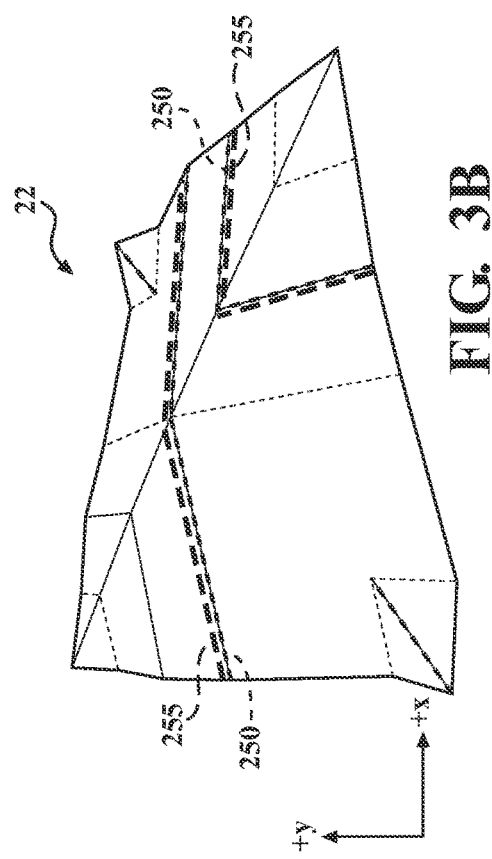
FIG. 3A shows a top view of a panel with origami folding lines configured to form a morphing origami structure according to the teachings of the present disclosure.
Figure 3B:
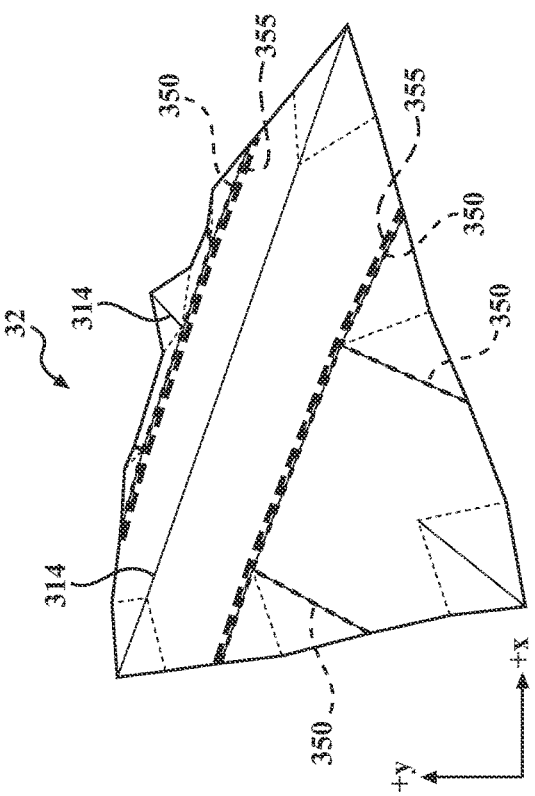
FIG. 3B shows a perspective view of the panel in FIG. 3A with the panel folded at the origami folding lines according to the teachings of the present disclosure.

Referring now to FIGS. 3A-3B, a panel 20 for forming a morphing origami structure according to one form of the present disclosure is shown in FIG. 3A and a morphing origami structure 22 formed from the panel 20 is shown in FIG. 3B. In some variations, the morphing origami structure 22 is a morphing aerodynamic origami structure, while in other variations the morphing origami structure 20 is not a morphing aerodynamic origami structure. And although not illustrated in FIGS. 3A-3B, in some variations the morphing origami structure 22 is an inflatable morphing origami structure 22.

The morphing origami structure 22 includes an outer covering 210 with one or more "valley" creases 212 (shown as dotted lines in the figures) between adjacent panels 215, one or more "ridge" creases 214 (shown as solid lines in the figures) between adjacent panels 215, and a light-responsive polymer 250 (illustrated as a dotted line) disposed on the outer covering 210 (reference numerals also shown on panel 20 in FIG. 3A for clarity). In some variations, the light-responsive polymer 250 is a coating disposed on one or more of the valley creases 212 and/or one or more of the peak creases 214. And in at least one variation the morphing origami structure 22 does not include a control unit attached thereto.

As used herein, the phrase "valley crease" refers to a crease of a morphing origami structure that forms a valley between adjacent panels when the adjacent panels are pivoted or rotated about and relative to the crease to form a desired deployed origami structure. Stated differently, a valley crease is a crease that is less elevated than adjacent panels forming the valley crease for a corresponding deployed origami structure. And as used herein the phrase "ridge crease" refers to a crease of a morphing origami structure that forms a ridge between adjacent panels when the adjacent panels are pivoted or rotated about and relative to the crease to form a desired deployed origami structure. Stated differently, a ridge crease is a crease that is more elevated than adjacent panels forming the ridge crease for a corresponding deployed origami structure.

As illustrated in FIG. 3B, pivoting adjacent panels 215 about and relative to a valley crease 212 and/or a peak crease 214 (collectively referred to herein as "creases 212, 214") results in or provides a three-dimensional structure from the two-dimensional outer covering 210. In addition, and as described in greater detail below, illuminating (activating) the light-responsive polymer 250 disposed on one or more of the creases 212, 214 controls and/or changes the shape of the morphing origami structure 22. That is, a predefined light activates and changes the shape of the light-responsive polymer 250, and an area or crease of the outer covering 210 where the light-responsive polymer is present and attached thereto, such that the outer covering 210 changes shape without the use of a mechanical or pneumatic system.

As noted or suggested above, the light-responsive polymer 250, and other light-responsive polymers disclosed herein, is/are configured to be activated when illuminated with a predefined light having a predefined light wavelength and/or a predefined range of light wavelengths. For example, in some variations the light-responsive polymer 250 is configured to change shape (e.g., shrink/contract or expand) when illuminated with a predefined light having wavelengths within the UV light range, while in other variations the light-responsive polymer 250 is configured to change shape when illuminated with a predefined light having wavelengths within the IR light range. And in at least one variation, the light-responsive polymer 250 is configured to change shape when illuminated with a light wavelength(s) having an intensity above a predefined threshold. In this manner the light-responsive polymer 250 can be activated independent of surrounding or ambient light such as light from the sun, indoor home lighting, indoor office lighting, and/or indoor factory lighting, among others.

In some variations, the light-responsive polymer 250 is configured to return to its original shape. For example, in some variations the light-responsive polymer 250, after being activated by light, returns to its original shape after being heated above a de-activation temperature. That is, the light-responsive polymer 250 has a de-activation temperature above which the material relaxes and recovers deformation that occurs during and/or after being illuminated with the predefined light. And in such variations, the morphing origami structure 20 can include one or more heating elements 255 (illustrated as a dotted line) configured to heat the light-responsive polymer 250 above its de-activation temperature.

Non-limiting examples of the light-responsive polymer 250, and other light-responsive polymers disclosed herein, include azobenzene-based polymers, triphenylmethane-based polymers, spiropyran-based polymers, polypeptide-based polymers, thermoplastic polyurethane polymers, among others. In addition, non-limiting examples of de-activation temperatures for the light-responsive polymer 250, and other light-responsive polymers disclosed herein, include 25° C., 30° C., 40° C., and 50° C., among others.

Figure 4A:
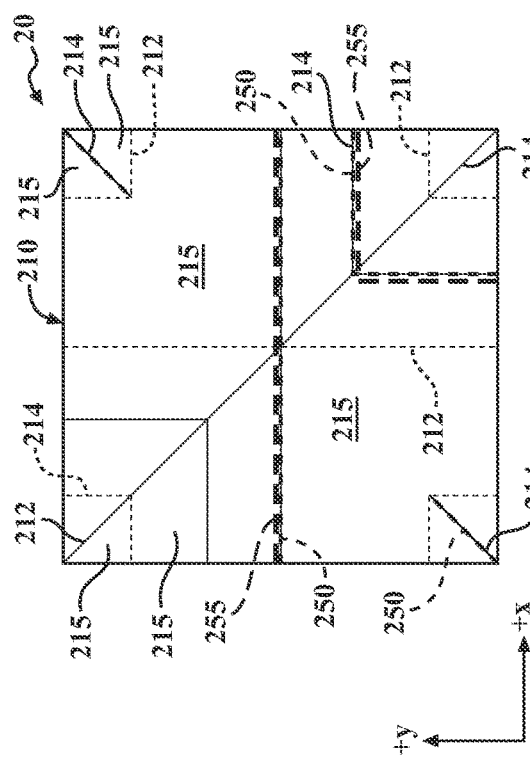
FIG. 4A shows a top view of another panel with origami folding lines configured to form a morphing origami structure according to the teachings of the present disclosure.
Figure 4B:
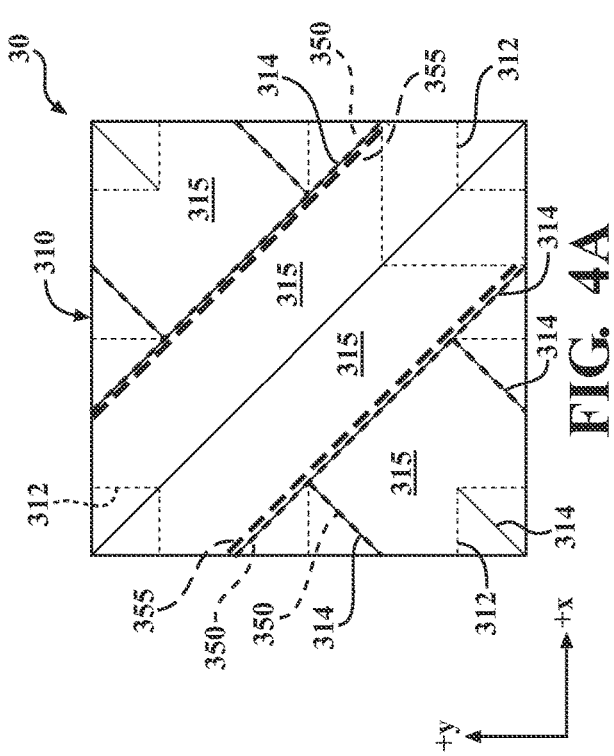
FIG. 4B shows a perspective view of the panel in FIG. 4A with the panel folded at the origami folding lines according to the teachings of the present disclosure.

Referring now to FIGS. 4A-4B, a panel 30 for forming a morphing origami structure according to another form of the present disclosure is shown in FIG. 4A and a morphing origami structure 32 formed from the panel 30 is shown in FIG. 4B. In some variations, the morphing origami structure 32 is a morphing aerodynamic origami structure, while in other variations the morphing origami structure 32 is not a morphing aerodynamic origami structure. And although not illustrated in FIGS. 4A-4B, in some variations the morphing origami structure 32 is an inflatable morphing origami structure 32.

The morphing origami structure 32 includes an outer covering 310 with one or more valley creases 312 between adjacent panels 315, one or more peak creases 314 between adjacent panels 315, and a light-responsive polymer 350 (illustrated as a dotted line) disposed on the outer covering 310 (reference numerals also shown on panel 30 in FIG. 4A for clarity). In some variations, the light-responsive polymer 350 is disposed on one or more of the valley creases 312 and/or one or more of the peak creases 314. And in at least one variation the morphing origami structure 32 does not include a control unit attached thereto.

As illustrated in FIG. 4B, pivoting adjacent panels 315 about and relative to a valley crease 312 and/or a peak crease 314 (collectively referred to herein as "creases 312, 314") results in or provides a three-dimensional structure from the two-dimensional outer covering 310. In addition, and as described in greater detail below, illuminating (activating) the light-responsive polymer 350 disposed on one or more of the creases 312, 314 controls and/or changes the shape of the morphing origami structure 32.

In some variations, the light-responsive polymer 350 is configured to return to its original shape. For example, in some variations the light-responsive polymer 350, after being activated by a predefined light, returns to its original shape after being heated above a de-activation temperature. That is, the light-responsive polymer 350 has a de-activation temperature above which the material relaxes and recovers deformation that occurs during and after being illuminated with the predefined light. And in such variations, the morphing origami structure 32 can include one or more heating elements 355 (illustrated as a dotted line) configured to heat the light-responsive polymer 350 above its de-activation temperature.

Figure 5A:
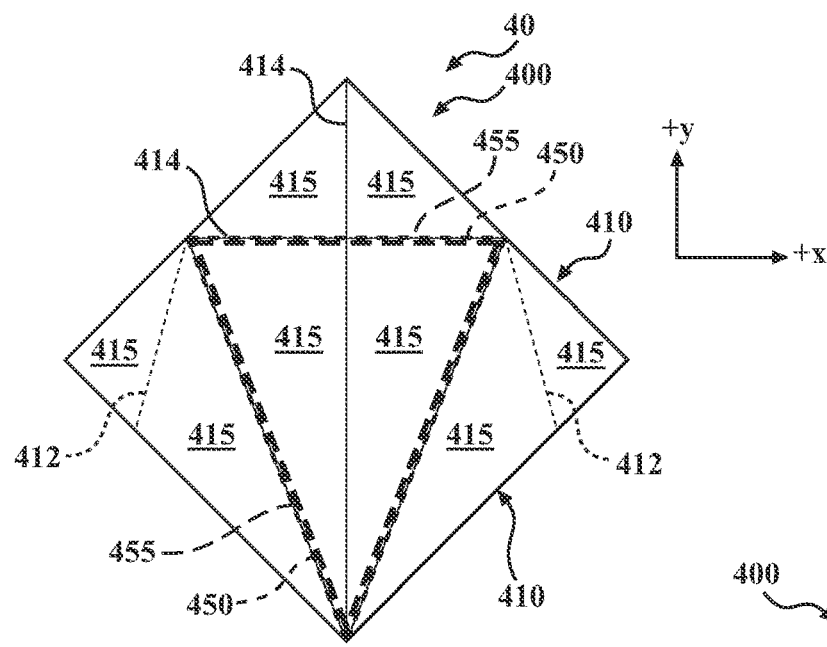
FIG. 5A shows a top view of still another panel with origami folding lines configured to form a morphing aerodynamic origami structure according to the teachings of the present disclosure.
Figure 5B:
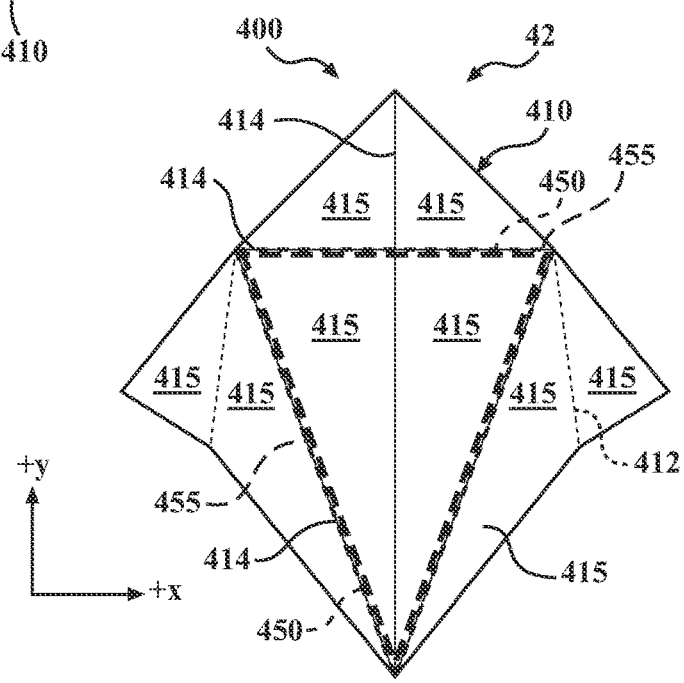
FIG. 5B shows a top view of the panel in FIG. 5A with the panel folded at the origami folding lines according to the teachings of the present disclosure.
Figure 5C:
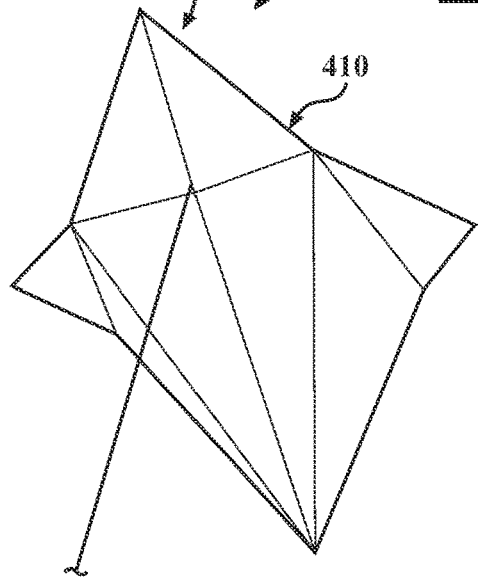
FIG. 5C shows a perspective view of the morphing aerodynamic origami structure formed from the panel in FIG. 5A during flight according to the teachings of the present disclosure.

Referring to FIGS. 5A-5C, a panel 40 for forming a morphing aerodynamic origami structure according to one form of the present disclosure is shown in FIG. 5A, a top view of a morphing aerodynamic origami structure 42 formed from the panel 40 is shown in FIG. 4B, and a perspective view of the morphing aerodynamic origami structure 42 in flight is illustrated in FIG. 5C. The morphing aerodynamic origami structure 42 includes a body 400 with an outer covering 410, a tether 440 attached to the body 400, and a light-responsive polymer 450 (illustrated as a dotted line) disposed on the outer covering 410 (reference numerals also shown on panel 40 in FIG. 5A for clarity). In some variations, the outer covering 410 includes one or more valley creases 412 and one or more peak creases 414. And in such variations, the light-responsive polymer 450 can be disposed on one or more of the valley creases 412 and/or one or more of the peak crease 414 as illustrated in FIGS. 5A-5B such that activation of the light-responsive polymer 450 is used to control the shape of outer covering 410 during flight of the morphic aerodynamic origami structure 42. In addition, one or more heating elements 455 (illustrated as a dotted line) can be included such that the light-responsive polymer 450 is heated above its de-activation temperature and returns to an original shape and/or to a shape between an activated shape and its original shape. And although not illustrated in FIGS. 5A-5C, in some variations the morphing aerodynamic origami structure 42 is an inflatable morphing aerodynamic origami structure 42.

Figure 6B:
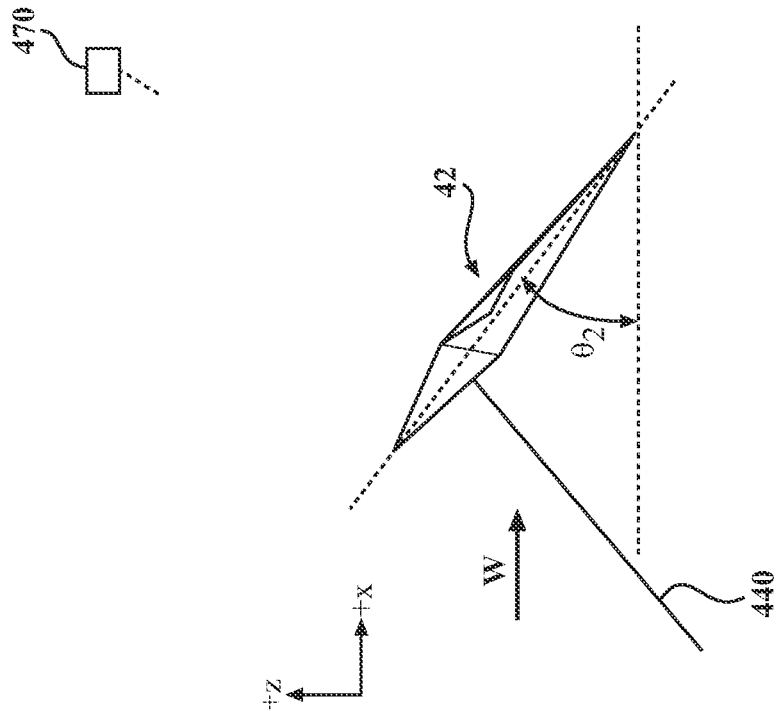
FIG. 6B shows a side view of the morphing aerodynamic origami structure in FIG. 5C with a second angle of attack provided by activation of a light-responsive polymer on an origami folding line according to the teachings of the present disclosure.
Figure 6B:
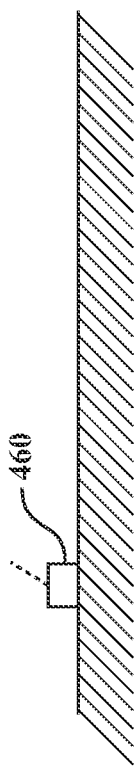
Figure 6A:
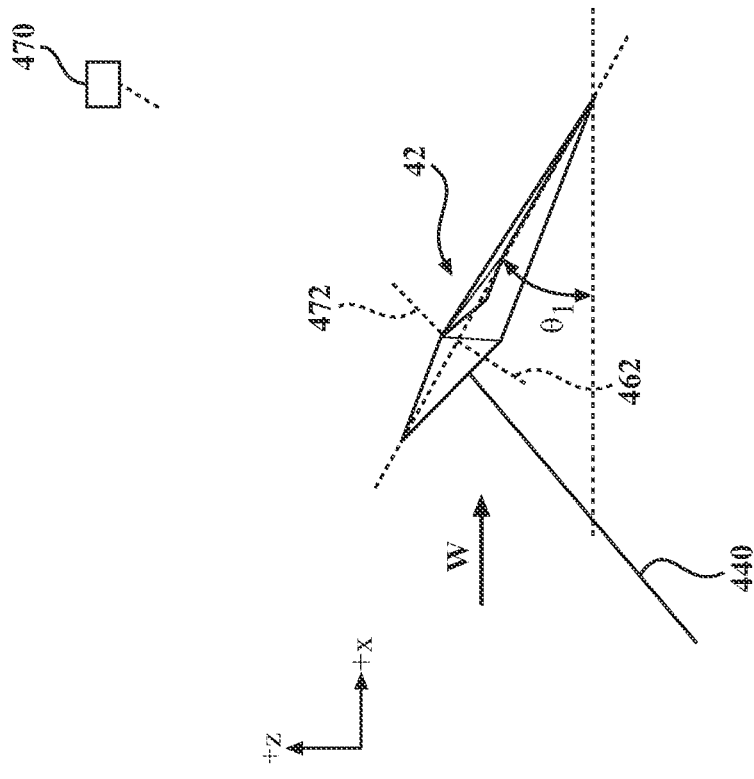
FIG. 6A shows a side view of the morphing aerodynamic origami structure in FIG. 5C with a first angle of attack.
Figure 6A:
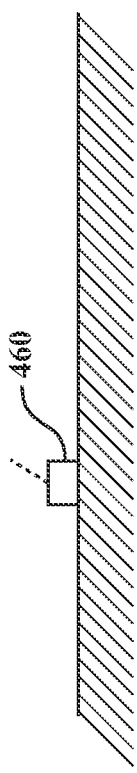

Referring now to FIGS. 6A-6B, the morphing aerodynamic origami structure 42 with a first shape and having a first angle of attack $\theta_1$ is shown in FIG. 6A, and the morphing aerodynamic origami structure 42 with a second shape and having a second angle of attack $\theta_2$ larger than the first angle of attack $\theta_1$ is shown in FIG. 6B. Particularly, activation of the light-responsive polymer 450 on the ridge crease 414 extending parallel to the x-direction in FIGS. 5A-5B (referred to hereafter as the "activated crease 414") with a laser 462 from a ground-based laser 460 and/or a laser 472 from an air-based laser 470 is illustrated in FIG. 6A. And activation of the ridge crease 414 extending parallel to the x-direction in FIGS. 5A-5B with the laser 462, 472 results in the light-responsive polymer 450 disposed thereon to change shape, the panels 415 on both sides of the activated crease 414 pivoting or rotating thereabout, and the angle of attack of the morphing aerodynamic origami structure 42 increasing from $\theta_1$ to $\theta_2$.

In some variations, one or more creases of the morphing aerodynamic origami structure 42 can be activated such that that a roll, pitch, and yaw of the body 400 are controlled and a desired flight path of the morphing aerodynamic origami structure 42 is provided. For example, one or both of the ridge creases 414 extending from the ridge crease 414 extending parallel to the x-direction in FIGS. 5A-5B can be activated with the laser 462, 472 such that the angle(s) between adjacent panels 415 changes and the flight path of the morphing aerodynamic origami structure 42 is controlled.

The light-responsive polymer 450 is configured to change shape when activated or illuminated by a predefined light source, e.g., an on-board LED, an on-board laser, and/or an off-board laser, which in turn changes the shape of the outer covering 410 where the light-responsive polymer 450 is present. In some variations, the light responsive polymer 450 shrinks (decreases in volume) when activated by a predefined light wavelength or predefined range of light wavelengths, while in other variations the light responsive polymer 450 expands (increases in volume) when activated by a predefined light wavelength or predefined range of light wavelengths. As used herein, the term "on-board" refers to a light source attached to the morphing aerodynamic origami structure 42 and the term "off-board" refers to a light source not attached to the morphing aerodynamic origami structure 42. For example, in some variations a ground-based laser 460 and/or an air-borne laser 470 (e.g., a balloon-based laser) is used to illuminate one or more areas of the light-responsive polymer 450. In the alternative, or in addition to, an optional on-board laser (not shown) is used to illuminate one or more areas of the light-responsive polymer 450.

Similar to the morphing origami structures 22 and 32 discussed above, in some variations the morphing aerodynamic origami structure 42 can include one or more heating elements 455 configured to heat the light-responsive polymer 450 above its de-activation temperature such that the light-responsive polymer 450, and a respective crease on which the light-responsive polymer 450 is disposed, return to its original shape and/or move towards its original shape when heated above the de-activation temperature. Stated differently, activation (i.e., illuminating) and de-activation (e.g., heating) of one or more of the creases 412, 414 controls and changes the morphing aerodynamic origami structure 42 between a plurality of shapes such that the flight of morphing aerodynamic origami structure 42 is desirably controlled.

In operation, and with reference to FIGS. 2A-2B and FIGS. 6A-6B, laser 462 and/or laser 472 from the artificial light source 460 and/or 470, respectively, illuminates one or more of the creases 412, 414 and such illumination activates and contracts (shrinks) or expands the light-responsive polymer 450 disposed thereon. Accordingly, the one or more creases 412, 414 contract or expands as desired and the angle of attack of the morphing aerodynamic origami structure 42 increases for the reel-out stage (FIG. 2A). In addition, laser 462 and/or laser 472 from the light source(s) illuminates one or more of the creases 412, 414 such that the roll, pitch, and/or yaw of the morphing aerodynamic origami structure 42 is desirably controlled and the morphing aerodynamic origami structure 42 flies the figure-eight flight path P during the reel-out stage (FIG. 2A). And after the tether 440 has extended from the electric generator EG by a predefined amount and/or a desired amount of electricity has been generated, laser 462 and/or laser 472 from the light source 460 and/or 470, respectively, illuminates one or more of the creases 412, 414 such that the angle of attack of the morphing aerodynamic origami structure 42 decreases for the reel-in stage (FIG. 2B). In the alternative, or in addition to, one or more of the heating elements 455 is activated and heats a corresponding one or more creases 412, 414 to assist in changing the shape and controlling the flight of the morphing aerodynamic origami structure 42.

Figure 7:
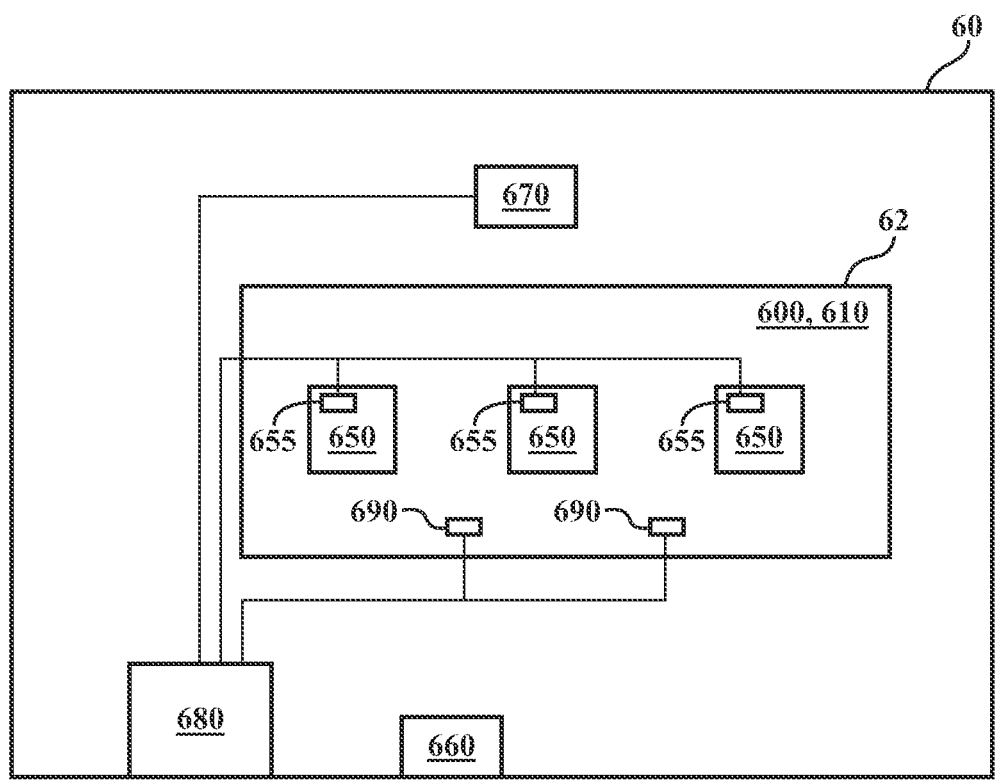
FIG. 7 is a block diagram for a morphing origami structure system according to the teachings of the present disclosure.

Referring now to FIG. 7, a block diagram for a morphing origami structure system 60 is shown. In some variations the morphing origami structure system 60 includes an aerodynamic origami structure, while in other variations the morphing origami structure system 60 does not include an aerodynamic origami structure. The morphing origami structure system 60 includes a morphing origami structure 62 with a body 600 that has an outer covering 610, and the outer covering 610 includes one more creases (not labeled) with a light-responsive polymer 650 disposed thereon. In some variations, the light-responsive polymer 650 is disposed on an entire length of the creases, in other variations the light-responsive polymer 650 is disposed only on a portion of the length of the creases, and in at least one variation the creases are made from the light-responsive polymer 650.

The morphing origami structure system 60 also includes at least one artificial light source 660, 670 spaced apart from the morphing origami structure 62 and in communication with a controller 680. In some variations, one or more heating elements 655 are disposed on the one or more creases and in communication with the controller 680, and in at least one variation one or more sensors 690 in communication with the controller 680 are included and configured to monitor the shape of the of the morphing origami structure 62 and/or detect a change in shape of the morphing origami structure 62.

In operation, the controller 680 commands the light source 660 and/or the light source 670 to illuminate the light-responsive polymer 650 on the one or more creases such that the light-responsive polymer 650, and the corresponding creases of the outer covering 610 changes shape (e.g., contracts) and the morphing origami structure 62 moves from a first shape to one or more second desired shapes. And in some variations, the controller commands one or more of the heating elements 655 to increase in temperature thereby heating one or more respective creases and the light-responsive polymer 650 disposed thereon above a predefined de-activation temperature such that the morphing origami structure 62 moves from one or more second desired shapes to one or more third desired shapes (e.g., back to the first shape). In this manner the morphing origami structure system 60 is configured to control the shape and functional characteristics of the morphing origami structure 62. And it should be understood that the morphing origami structure 62 can be a morphing aerodynamic origami structure as described above.

Figure 8:
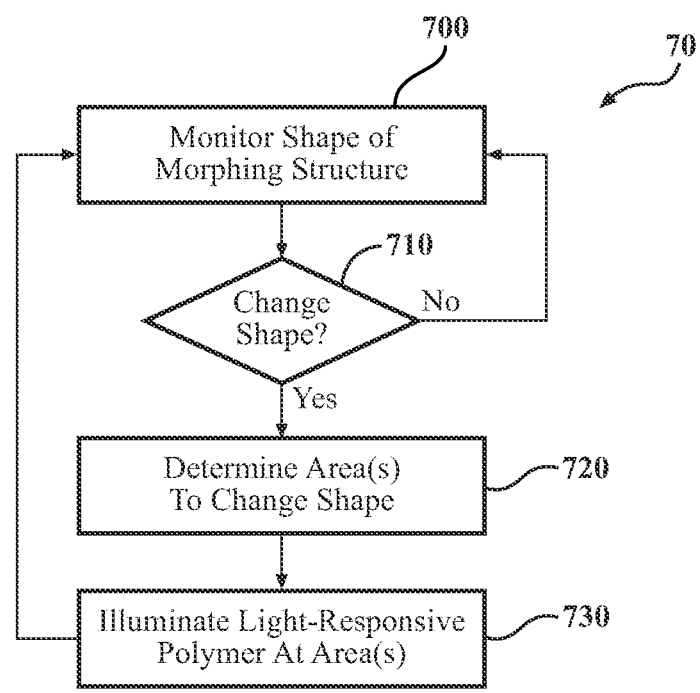
FIG. 8 is a flow chart for a method of controlling a morphing origami structure according to the teachings of the present disclosure.

Referring now to FIG. 8, a method 70 for controlling the shape of a morphing origami structure as described above includes monitoring the shape at 700 and determining whether or not the shape should be changed at 710. In some variations, the shape is monitored using one or more sensors disposed on and/or attached to the morphing origami structure, and the one or more sensors can be in communication with a controller configured to receive signals from the one or more sensors. Also, in at least one variation whether or not the shape of the morphing origami structure should be changed is determined by the controller. If a change in the shape of the morphing origami structure is not desired, the method 70 returns to 700 where continued monitoring of the morphing origami structure continues and this cycle, i.e., 700-710-700, continues until the shape of the morphing origami structure is determined to be changed at 710. The method 70 then continues to 720 where which area or areas of the morphing origami structure should be changed is determined.

The method 70 then continues to 730 where light-responsive polymer disposed on the determined crease or creases is illuminated with a light source such that the light-responsive polymer and the corresponding crease or creases change shape as desired. The method returns to 700 where continued monitoring of the morphing shape occurs and determination of whether or not additional changing of the shape is desired at 710. This cycle, i.e., 700-710-720-730-700 continues until a desired shape of the morphing origami structure is provided.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A morphing structure comprising:
   a deployable origami structure comprising an outer covering, the outer covering comprising a plurality of panels with a plurality of creases between adjacent panels such that the deployable origami structure is configured to fold and change from a first shape to a second shape different than the first shape during flight of the deployable origami structure; and
   a light-responsive polymer disposed on the outer covering, the light-responsive polymer configured to change shape when activated by a light such that the deployable origami structure folds and changes from the first shape to the second shape during flight when the light-responsive polymer is activated.

2. The morphing structure according to claim 1, wherein the plurality of creases comprises one or more valley creases and one or more ridge creases, and the light-responsive polymer is disposed on one or more of the plurality of creases of the outer covering.

3. The morphing structure according to claim 1, wherein the light-responsive polymer is a coating on one or more of the plurality of creases of the deployable origami structure.

4. The morphing structure according to claim 1, wherein the light-responsive polymer is at least one fiber wound into one or more of the plurality of creases of the deployable origami structure.

5. The morphing structure according to claim 1, wherein one or more of the plurality of creases of the deployable origami structure is formed from the light-responsive polymer.

6. The morphing structure according to claim 1, wherein the deployable origami structure is a deployable aerodynamic origami structure.

7. The morphing structure according to claim 6 further comprising a tether attached to the deployable origami structure.

8. The morphing structure according to claim 7, wherein the deployable aerodynamic origami structure is a high-altitude kite.

9. The morphing structure according to claim 1 further comprising an artificial light source configured to illuminate the light-responsive polymer disposed on the outer covering.

10. The morphing structure according to claim 9, wherein the artificial light source is a laser.

11. The morphing structure according to claim 10, wherein the laser is a ground-based laser.

12. The morphing structure according to claim 10, wherein the laser is an air-based laser.

13. The morphing structure according to claim 12, wherein the air-based laser is selected from the group consisting of a laser attached to the deployable origami structure and a laser not attached to the deployable origami structure.

14. The morphing structure according to claim 1 further comprising at least one heating element disposed on the deployable origami structure, the at least one heating element configured to heat the light-responsive polymer.

15. The morphing structure according to claim 14, wherein the light-responsive polymer and the at least one heating element are disposed on one or more of the plurality of creases of the deployable origami structure.

16. A morphing structure comprising:
   a deployable aerodynamic origami structure comprising an outer covering, the outer covering comprising a plurality of panels with a plurality of creases between adjacent panels such that the deployable aerodynamic origami structure is configured to fold and change from a first shape to a second shape different than the first shape during flight of the deployable aerodynamic origami structure;
   a tether attached to the deployable aerodynamic origami structure; and
   a light-responsive polymer disposed on one or more of the creases of the outer covering, the light-responsive polymer configured to change shape when activated by a light such that the deployable aerodynamic origami structure folds and changes from the first shape to the second shape during flight when the light-responsive polymer is activated.

17. The morphing structure according to claim 16 further comprising an artificial light source configured to illuminate the light-responsive polymer disposed on the outer covering and at least one heating element configured to heat the light-responsive polymer.

18. The morphing structure according to claim 17, wherein the deployable aerodynamic origami structure is a high-altitude kite.

19. A morphing structure comprising:
- a deployable aerodynamic origami structure comprising an outer covering with a plurality of creases, the outer covering comprising a plurality of panels with a plurality of creases between adjacent panels such that the deployable aerodynamic origami structure is configured to fold and change from a first shape to a second shape different than the first shape during flight of the deployable aerodynamic origami structure;
- a tether attached to the deployable aerodynamic origami structure;
- a light-responsive polymer disposed on one or more of the creases of the outer covering, the light-responsive polymer configured to change shape when activated by a light and the deployable aerodynamic origami structure configured to fold and change from the first shape to the second shape during flight of the deployable aerodynamic origami structure when the light-responsive polymer is activated; and
- at least one heating element disposed on one or more of the creases of the outer covering, the at least one heating element configured to heat the light-responsive polymer such that the deployable aerodynamic origami structure moves from the second shape towards the first shape during flight of the deployable aerodynamic origami structure.

20. The morphing structure according to claim 19 further comprising an artificial light source configured to illuminate the light-responsive polymer such that the light-responsive polymer is activated.

* * * * *